United States Patent [19]
Kauffman

[11] Patent Number: 5,627,892
[45] Date of Patent: May 6, 1997

[54] DATA SECURITY SCHEME FOR POINT-TO-POINT COMMUNICATION SESSIONS

[75] Inventor: Marc W. Kauffman, Ft. Washington, Pa.

[73] Assignee: General Instrument Corporation of Delaware, Chicago, Ill.

[21] Appl. No.: 420,710

[22] Filed: Apr. 19, 1995

[51] Int. Cl.$^6$ .............................. H04L 9/00; H04N 7/167
[52] U.S. Cl. .............................. 380/21; 380/49; 380/20
[58] Field of Search .............................. 380/21, 49, 7, 380/20, 10, 13; 370/92, 94.2

[56] References Cited

U.S. PATENT DOCUMENTS

| Re. 33,189 | 3/1990 | Lee et al. | 380/20 |
|---|---|---|---|
| 4,613,901 | 9/1986 | Gilhousen et al. | 380/20 |
| 4,736,422 | 4/1988 | Mason | 380/20 |
| 4,928,274 | 5/1990 | Gilhousen et al. | 370/92 |
| 4,991,208 | 2/1991 | Walker et al. | 380/20 |
| 5,115,467 | 5/1992 | Esserman et al. | 380/44 |
| 5,144,664 | 9/1992 | Esserman et al. | 380/20 |
| 5,173,900 | 12/1992 | Miller et al. | 370/110.1 |
| 5,311,541 | 5/1994 | Sanderford, Jr. | 380/48 X |
| 5,319,707 | 6/1994 | Wasilewski et al. | 380/14 |
| 5,392,353 | 2/1995 | Morales | 380/20 |
| 5,412,724 | 5/1995 | Mary | 380/20 |
| 5,414,773 | 5/1995 | Handelman | 380/49 |
| 5,504,816 | 4/1996 | Hamilton et al. | 380/20 |

FOREIGN PATENT DOCUMENTS

| 0594353 | 4/1994 | European Pat. Off. | H04N 7/173 |
|---|---|---|---|
| WO94/19909 | 9/1994 | WIPO | H04N 7/167 |

*Primary Examiner*—Thomas H. Tarcza
*Assistant Examiner*—Pinchus M. Laufer
*Attorney, Agent, or Firm*—Barry R. Lipsitz; Ralph F. Hoppin

[57] ABSTRACT

Secure point-to-point communication of information to specific terminals is provided via a shared network. Far in advance of the establishment of an information session with a particular one of a plurality of terminals, a unique session identifier is securely delivered to the terminal by a highly secure entity. Information to be provided to the terminal is subsequently encrypted under the session identifier of that terminal by an insecure connection manager. The encrypted information is inserted into designated locations in a signal multiplex. The signal multiplex is transmitted over a portion of the network serving the terminal that is to receive the information. The terminal is informed of the designated locations of the encrypted information in the signal multiplex and of a transmission frequency at which the signal multiplex is carried on the network portion. The terminal tunes to the transmission frequency to locate the signal multiplex, recovers the encrypted information from the designated locations in the multiplex, and then decrypts the information using the terminal's unique session identifier.

18 Claims, 3 Drawing Sheets

DATA SECURITY SCHEME FOR POINT-TO-POINT COMMUNICATION SESSIONS

BACKGROUND OF THE INVENTION

The present invention relates generally to security apparatus for information processing systems, and more particularly to a system for providing controlled access to information signals in a point-to-point communication system that shares a common communication path.

In point-to-point communication systems, transmissions must be secured so that parties other than the one for which the transmission is intended cannot intercept or decode the transmission. There are many schemes available for controlling access to electronic signals, such as in the cable television environment. Other applications in which security schemes are required are broadband telephony systems, broadband multimedia systems and broadband video on demand systems.

Typically, a system subscriber is provided with a decoder connected between a signal source (e.g., cable television feed or satellite television receiver) and an output device such as a television set, video recorder, personal computer, or the like. Each subscriber's decoder is remotely accessed by the system operator to enable or disable the receipt of specific services such as the Home Box Office (HBO) movie channel or special pay-per-view sports events. In the past, distribution of such premium services (i.e., services which require a recipient to pay an additional fee) have been distributed to a plurality of subscribers at the same time. This was necessary because existing technology required a particular movie, for example, to be broadcast at a specific time for viewing by any authorized viewer that wanted to receive it. Thus, any subscriber that wanted to see a particular movie was required to tune into the movie at the scheduled time.

Technology now exists to enable the provision of information services, such as movies, special events, data services or the like, on demand. In such systems, point-to-point virtual connections are established between a "headend" or "central office" and an individual subscriber to enable the subscriber to view, e.g., a movie or special event at whatever time the subscriber desires. As with past distribution systems in which individual programs were broadcast according to a predefined schedule, the new point-to-point systems require security measures to prevent freeloaders ("pirates") from intercepting the signals and obtaining them without paying the required fee. Security measures are also necessary to prevent the privacy of a legitimate user from being violated. Even with security measures in place, pirates may attempt to break the system security and sell "black boxes" that enable the unauthorized reception of programming and data. It has been difficult and expensive for system operators to contend with the piracy problem.

Various systems have been designed to make piracy more difficult in the broadcast environment, where a plurality of subscribers are all receiving the same premium services at the same time. One such system is disclosed in U.S. Pat. No. 4,613,901 to Gilhousen, et al. entitled "Signal Encryption and Distribution System for Controlling Scrambling and Selective Remote Descrambling of Television Signals." In the Gilhousen, et al. scheme, various cryptographic keys are used to provide an encrypted television signal. Among the keys described are category keys, each common to a different subset of subscriber decoders. It is also known to provide program keys, in which each television program has a specific key associated therewith that is necessary to descramble or decrypt the particular program signal.

U.S. Pat. No. 5,115,467 to Esserman, et al. entitled "Signal Encryption Apparatus for Generating Common and Distinct Keys" also deals with the security issue. The generation of various different types of keys and their use is disclosed in the patent.

Encryption systems have been used in point-to-point systems for securing transmitted signals from unauthorized reception. In such methods, the data is coded such that parties without the appropriate "session key" are not able to decipher the transmission. When such a scheme is used in a shared media environment, it has required the dissemination of session keys prior to the establishment of each session. Session keys must be held in the utmost confidence as their compromise represents an opportunity for illegitimate parties to receive a transmission which they are not authorized to receive.

Another solution to the secure transmission of information signals in point-to-point systems is a "space division" system. In such systems, individual wires are employed to carry each session. The only signal present on the individual line is the one destined for the end node connected to that line. Users at other end nodes do not have access to transmissions that they are not authorized to receive.

Space division systems have the drawback that they are expensive to establish and maintain. A separate wired path must be provided from the headend to each individual subscriber. The cost of installing and maintaining such individual paths is prohibitive.

Known encryption systems are not optimal for point-to-point communications over shared media. In particular, such known encryption systems require the secure handling of the session keys. This places an added burden on the system operators that control the various headend sites at which the signal distribution to individual subscribers originates.

It would be advantageous to provide a point-to-point security scheme that allows "common keys" to be used for all sessions within the network. Common keys are keys which are used across a population of different subscribers. The common keys are changed periodically, e.g., monthly, and the same keys are distributed to different subscribers. Such common keys are disseminated far in advance of the establishment of any particular communication session, in which information is provided from the headend to an individual subscriber. The advantageous use of common keys would allow the information required to establish a secure session to be handled with a lower level of security than in the past. An advantageous result would be that a managing entity, such as a connection management system, would be able to establish session security without handling secure information. By eliminating the requirement that the managing entity handle secure information, the cost of the associated secure hardware and software as well as the cost burden of handling secure information would be saved.

The present invention provides a data security scheme for a point-to-point communication system having the aforementioned advantages. More particularly, the present invention takes the handling of secure information out of the hands of the connection management system or other managing entity, and places it in a centralized "encryption controller" that may be maintained in a hardened bunker or other secure area for communication with the signal switching and distribution components of the system on an "as needed" basis; e.g., for system configuration. Once the connection management system has been configured, the encryption controller is not required to participate in the actual set up of individual sessions.

SUMMARY OF THE INVENTION

In accordance with the present invention, a method is provided for secure point-to-point communication of information to specific terminals coupled to a shared network. A different session identifier is securely delivered to each of a plurality of terminals coupled to the network. Information to be provided to one of the terminals is encrypted under the session identifier of that terminal. The encrypted information is inserted into designated locations of a signal multiplex. The signal multiplex is transmitted over a portion of the network serving the terminal that is to receive the information. The terminal is informed (e.g., via a separate signaling channel) of the designated locations of the encrypted information in the signal multiplex. The terminal is also informed of a transmission frequency at which the signal multiplex is carried on the network portion. With this information, the terminal can tune to the transmission frequency to locate the signal multiplex. Once the signal multiplex is located, the terminal can recover the encrypted information it is to receive from the designated locations in the signal multiplex. Then, the terminal can decrypt the information using the terminal's session identifier.

The method can comprise the further steps of providing a common key to each of the plurality of terminals and encrypting the information under the common key as well as under the session identifier of the terminal that is to receive the information. In this manner, the terminal can decrypt the information using its session identifier and the common key.

In a preferred embodiment, the terminal is instructed during the informing step to tune to the transmission frequency to locate the encrypted information for decryption. It is possible for the informing step to use the session identifier to direct specific instructions to the terminal. Alternatively, the terminal can include a unique address which is used by the informing step to direct specific instructions to the terminal. In another arrangement, both the session identifier and terminal address can be used to direct specific instructions to the terminal. Either or both of the address and session identifier for a particular terminal can be delivered to and loaded into that terminal during installation thereof at an end user location.

The present invention also provides a shared communication network that enables secure point-to-point communication of information to specific terminals coupled to the network. A plurality of terminals are coupled to the network, each having a session identifier stored therein in a secure manner. Means are provided for encrypting information for one of the terminals under the session identifier of that terminal. Insertion means insert the encrypted information into designated locations in a signal multiplex. A transmitter is provided for transmitting the signal multiplex over a portion of the network serving the terminal that is to receive the information. Means are provided for informing the terminal that is to receive the information of the designated locations of the encrypted information in the signal multiplex. The terminal is also informed of a transmission frequency at which the signal multiplex is carried on the network portion. The terminals can be responsive to their session identifiers and/or to unique addresses associated therewith for receiving instructions directed thereto from the informing means.

The terminal includes a frequency agile tuner for tuning to the transmission frequency to locate the signal multiplex in response to instructions from the informing means. Means are provided in the terminal for recovering the encrypted information from the designated locations of the signal multiplex and for decrypting the recovered encrypted information using the terminal's session identifier.

Apparatus in accordance with the invention can further comprise encryption control means for providing a common key to the encrypting means and to each of the plurality of terminals. The encrypting means can then encrypt the information under the common key as well as under the session identifier of the terminal that is to receive the information. The terminal then decrypts the information using its session identifier and the common key.

The encryption control means can be separate from and more secure than the encrypting means. The encryption control means will securely maintain a unique unit key for each of the terminals. The unit keys are used by the encryption control means to securely communicate the session identifiers to their respective terminals.

A plurality of information servers can be provided. These servers output particular information (e.g., data services, television programs, movies or special events) on request. A switch is used with the information servers for routing data to appropriate distribution nodes and selectively combining information from the servers into the signal multiplex. In an illustrated embodiment, a plurality of switches is coupled to the plurality of information servers for selectively combining information from the servers into a plurality of multiplexes. The different multiplexes are then transmitted on different portions of the network. For example, different multiplexes can be transmitted to different neighborhoods.

A terminal is provided for receiving information specifically directed thereto from a service provider over a shared communication network. The terminal includes means for securely receiving and storing a session identifier that is unique to the terminal. Means are provided for receiving frequency and demultiplexing instructions from a connection manager. A frequency agile receiver responsive to the frequency instructions tunes to a frequency at which a signal multiplex containing information for the terminal is carried on the network. A demultiplexer, responsive to the demultiplexing instructions, retrieves encrypted information specifically directed to the terminal. The terminal further includes decryption means for decrypting the encrypted information using the session identifier.

The terminal can include means for receiving and storing a common key under which the information is also encrypted. The decryption means will then decrypt the encrypted information using the common key and the session identifier. The session identifier can be encrypted under a unit key that is unique to the terminal.

In a similar manner, the point to point security scheme can also be used to secure information flowing from the terminal back through the network to an information provider. In such an instance, the terminal will send information back to the information provider encrypted at least under the terminal's unique session identifier.

DETAILED DESCRIPTION OF THE INVENTION

The following detailed description of the invention refers to a video on demand system. It should be appreciated, however, that the system is also applicable to other interactive service delivery systems. Such systems include the delivery of audio, text and/or graphic data for any desired purpose, including business communications, financial transactions, the purchase of goods and services via computer, telephony, and the like. The invention is also applicable to data transmitted in a return direction from a user terminal to an information provider.

Figure 1:
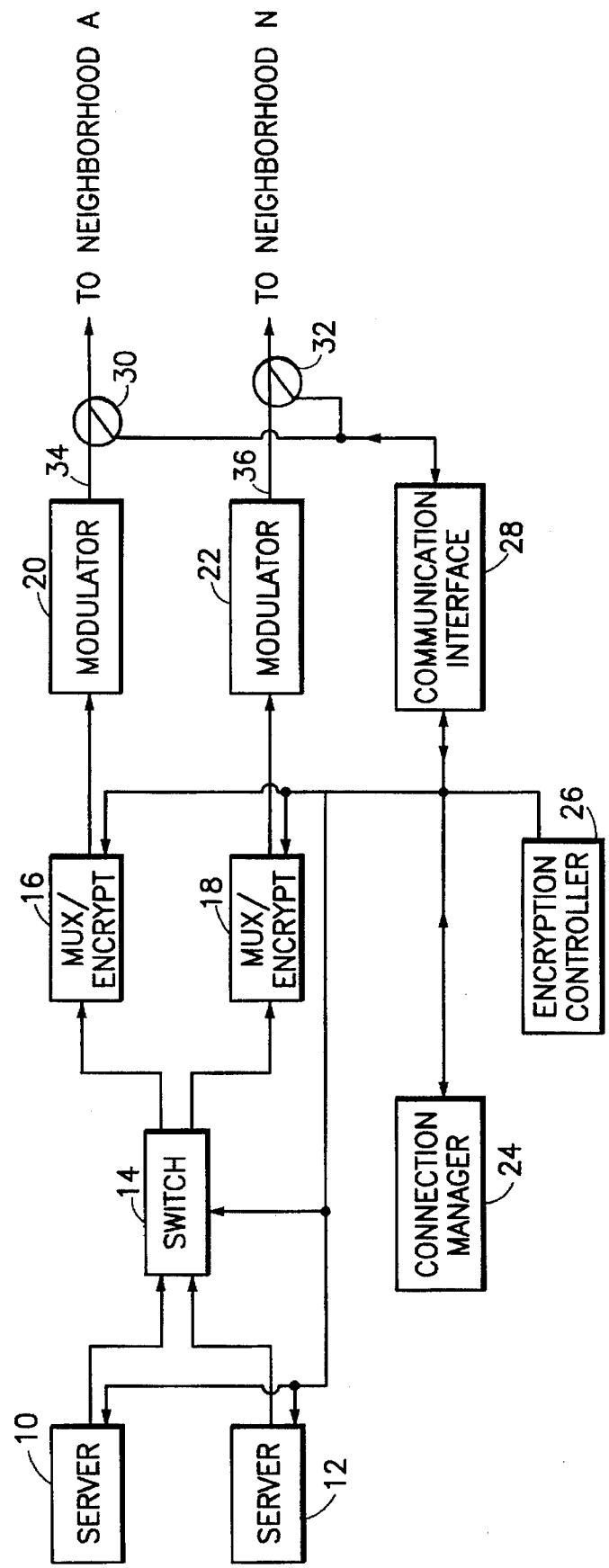
FIG. 1 is a block diagram of an encryption controller and various headend components in an illustrative embodiment of the present invention.

In the illustrative embodiment of FIG. 1, video programs originate from a plurality of video servers 10, 12 which store or originate digitized video, audio and related data. Upon request (e.g., from a subscriber) communicated via a communication interface 28, connection manager 24 will be instructed to initiate the delivery of the requested program. The connection manager will instruct a server that is storing the requested program to commence the output of the program data to a switch 14. The connection manager instructs the switch to route data from the specified server to a specified one of a plurality of multiplexer/encryptors 16, 18.

The multiplexer/encryptors combine a set of input data streams into a composite multiplex for delivery to a selected neighborhood. The multiplexer encryptors also encrypt each input (i.e., each program or data connection) uniquely for delivery to a single subscriber terminal in that neighborhood. The output of each multiplexer/encryptor is modulated by a corresponding modulator 20, 22 to radio frequency (RF), and converted to an appropriate frequency for transmission through a respective broadband media 34, 36 such as a fiber optic or coaxial distribution cable. The same broadband media that supplies signals to the various neighborhoods and ultimately, to individual subscriber terminals, also carries signals back to the communication interface from the subscriber terminals. Taps 30, 32 are provided for coupling signals to and from the subscriber terminals with the communication interface 28.

It should be appreciated that while only two servers 10, 12 with associated multiplexer encryptors 16, 18, modulators 20, 22, and broadband media 34, 26 are shown in FIG. 1, any number of such components may be provided in a signal distribution system in accordance with the present invention. The number of servers necessary will be dictated by the number of different programs expected to be served to an expected number of subscriber terminals at any one time. In implementing such a system, it will be understood that the capacities of the various components such as the servers and multiplexers must be taken into account. For example, if each server can handle 100 different connections and it is anticipated that 1,000 connection ports are required, it will be necessary to provide at least ten servers at the headend.

The encryption of the signals transmitted to individual subscriber terminals is controlled in a manner which obviates the need for the headend operator to handle secure information. When a terminal is installed, it is given a common key (e.g., monthly key) which is universal for the system or a subset thereof and is held by all terminals in the system or subset. Conventional means are utilized to disseminate and store this key in a manner that assures security. For example, the common key can be sent to each individual terminal encrypted under that terminal's unit key.

The common key originates in the encryption controller 26 and is transmitted to the terminal via the communication interface 28. The encryption controller also provides the common key to the multiplexer/encryptors 16, 18. The common key is used by the multiplexer/encryptors in encrypting the information signals (e.g., video programs) that are transmitted to the subscriber terminals.

In addition to disseminating a common key to a new terminal, and periodically changing the common keys among all or a subset of the installed terminals, the encryption controller 26 also assigns a unique session identifier to each individual terminal. Each installed terminal will only recognize point-to-point communications forwarded under its own session identifier. As with the dissemination of the common keys, known methods are employed to deliver and store the session identifier for each terminal in a secure manner. For example, each terminal can receive its particular session identifier encrypted under its unit key and/or under other keys known to the terminal. In this manner, a compromise of system security by either intercepting or clandestinely inserting an illegitimate session identifier into a secure terminal is prevented.

The encryption controller also delivers a copy of the unique session identifier for a particular terminal to the connection manager 24 and all other entities such as multiplexer/encryptors 16, 18 that require the session identifier in order to establish connections between system elements and the subscriber terminal that is to receive a particular service.

In response to an input from the subscriber terminal received via communication interface 28 or from one of the servers 10, 12, the connection manager will establish a connection from the appropriate server to the subscriber terminal. In order to do this, the connection manager will first send a message to switch 14 in order to establish a connection between the selected server and a multiplexer/encryptor that serves the neighborhood in which the selected subscriber terminal resides. Then, the connection manager will send a message to the multiplexer/encryptor specifying the output format necessary to properly communicate the signal to the subscriber terminal. For example, the multiplexer/encryptor may include a signal transcoder that can change a video signal in a first format (e.g., the asynchronous transfer mode (ATM) format) to a second format (such as the Moving Pictures Expert Group (MPEG) format) that may be required by the particular subscriber terminal. The connection manager also sends an identification signal to the multiplexer/encryptor that is to be included as a component of the output multiplex. This identification signal is necessary for the subscriber terminal to locate the proper service within a multiplex of services carried over the communication path.

The connection manager informs the multiplexer/encryptor of the unique session identifier assigned to the subscriber terminal that is to receive the particular signal being processed. It is noted that at any one time, each individual multiplexer/encryptor may be receiving a plurality of different signals that are all processed and communicated concurrently at different locations within the composite multiplexed output to the associated modulator. Thus, the connection manager will also identify to the multiplexer/encryptor a specific input of the multiplexer/encryptor that is receiving the particular signal from the switch 14.

Figure 2:
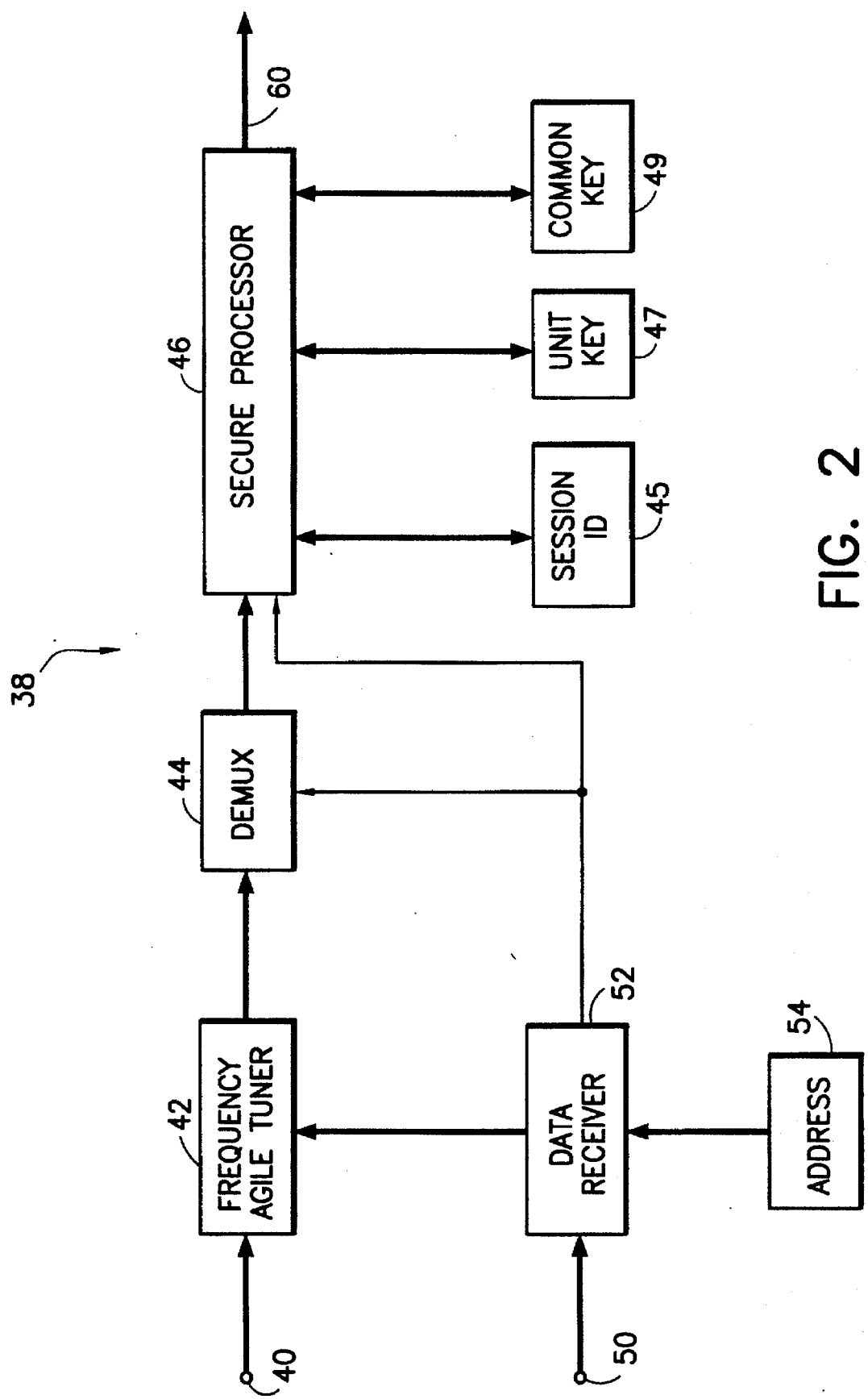
FIG. 2 is a block diagram of a subscriber terminal in an illustrative embodiment of the present invention.

In addition to supplying the multiplexer/encryptor with the information necessary to properly process a signal for transmission to a subscriber terminal, the connection manager will send a message to the subscriber terminal identifying the frequency on which the appropriate composite multiplex can be found and the component identifier which sets forth which component of the multiplex is the one that the subscriber terminal is to receive. This information is communicated to the subscriber terminal via the communication interface 28. Once the subscriber terminal has been informed of the proper frequency and component ID, it will tune to that frequency, locate the component of the incoming multiplex that is carrying the data for that terminal, and recover the component for decryption. The components of a subscriber terminal that perform these functions are illustrated in FIG. 2.

The subscriber terminal, shown generally at 38, receives the multiplex output by one of the modulators 20, 22 via the respective communication path 34, 36. The multiplex is input to a frequency agile tuner 42 via terminal 40. The signaling data from communication interface 28 is provided to a data receiver 52 via the same path; or via a separate signaling path (not shown) via terminal 50. For example, in a broadband implementation, the multiplex of program signals can be carried on one frequency and the control information from communication interface 28 can be carried on a separate frequency. Alternatively, both the program signal multiplex and the control data could be carried on a single frequency. Those skilled in the art will appreciate that the various ways of carrying the different data have advantages and disadvantages, and that each particular implementation will result from various engineering trade-offs.

It should also be appreciated that when bidirectional communication between the subscriber terminal and the service provider is provided via communication interface 28, a data transmitter (not shown) will be provided to communicate data (e.g., from secure processor 46) back to the service provider via the respective communication path 34, 36. Alternatively, data receiver 52 can be replaced with a data transceiver that can receive and transmit data via terminal 50. In the latter embodiment, the path between secure processor 46 and data transceiver 52 will be a bidirectional path, so that data from processor 46 (e.g., encrypted under the subscriber terminal's session identifier) can be output via terminal 50 to the communication interface 28 of the service provider.

In a preferred embodiment, each subscriber terminal will be provided with its own unique address 54 at the time of installation. The data receiver 52 uses this address in order to identify the particular control information that is being sent to that terminal. Upon recognizing data addressed to it, the data receiver will recover the control data. Such data will identify the frequency that carries a signal multiplex containing information for the terminal. It will also contain the multiplex component identifier which designates where in the signal multiplex the particular data for the terminal can be located. Upon receiving this information, data receiver 52 will actuate frequency agile tuner 42 to tune to the appropriate frequency such that the multiplex containing the information for the terminal is obtained. At the same time, a demultiplexer 44 is informed of the particular component in the received multiplex that contains the information for the subscriber terminal.

Demultiplexer 44 receives the multiplex from frequency agile tuner 44 and outputs the component of the multiplex that carries the information for the subscriber terminal. This component is passed on to a secure processor 46 that decrypts the data carried in the component output from the demultiplexer. Secure processor 46 uses the previously stored session identifier 45, and may also use the previously stored unit key 47 and/or the previously stored common key 49 in order to decrypt the data received from demultiplexer 44 for output on line 60.

Since the session ID 45 was loaded into the subscriber terminal in a secure manner (e.g., encrypted under the unit key), it is not possible for a pirate to load a generic session ID into other terminals in order to steal services by emulating an authorized terminal. The session ID can be originally loaded into the subscriber terminal via data receiver 52. Data receiver 52 can also receive new common keys on a periodic basis (e.g., monthly) via data receiver 52. As indicated above, the data receiver is able to receive only information addressed to the particular subscriber terminal due to the provision of the unique terminal address 54. The unit key, which is not changed after manufacture or original installation of the subscriber terminal, could be loaded via data receiver 52. Alternatively, the unit key can be provided in read only memory or via a hard wired approach within secure processor 46. Other known methods of establishing the unit key may also be used.

The system of the present invention provides security by limiting distribution of sensitive key information, such as common keys, to a small number of highly secured devices. Sensitive information is disseminated to subscriber terminals in a secure manner, such as by encryption under the unit key for the particular terminal. Secret information, such as the unit keys, is known only to the encryption controller 26. Since this secret information is required in order to deliver service authorization information to the individual subscriber terminals, a pirate cannot load an illegal authorization into a terminal.

Advantageously, the service authorization information, which is based on the session ID of a terminal that is to receive a particular communication, can be disseminated to nonsecure session management entities such as the connection manager 24. By using the session ID information, these nonsecure session management entities can establish session connectivity autonomously, without the immediate involvement of the encryption controller.

Figure 3:
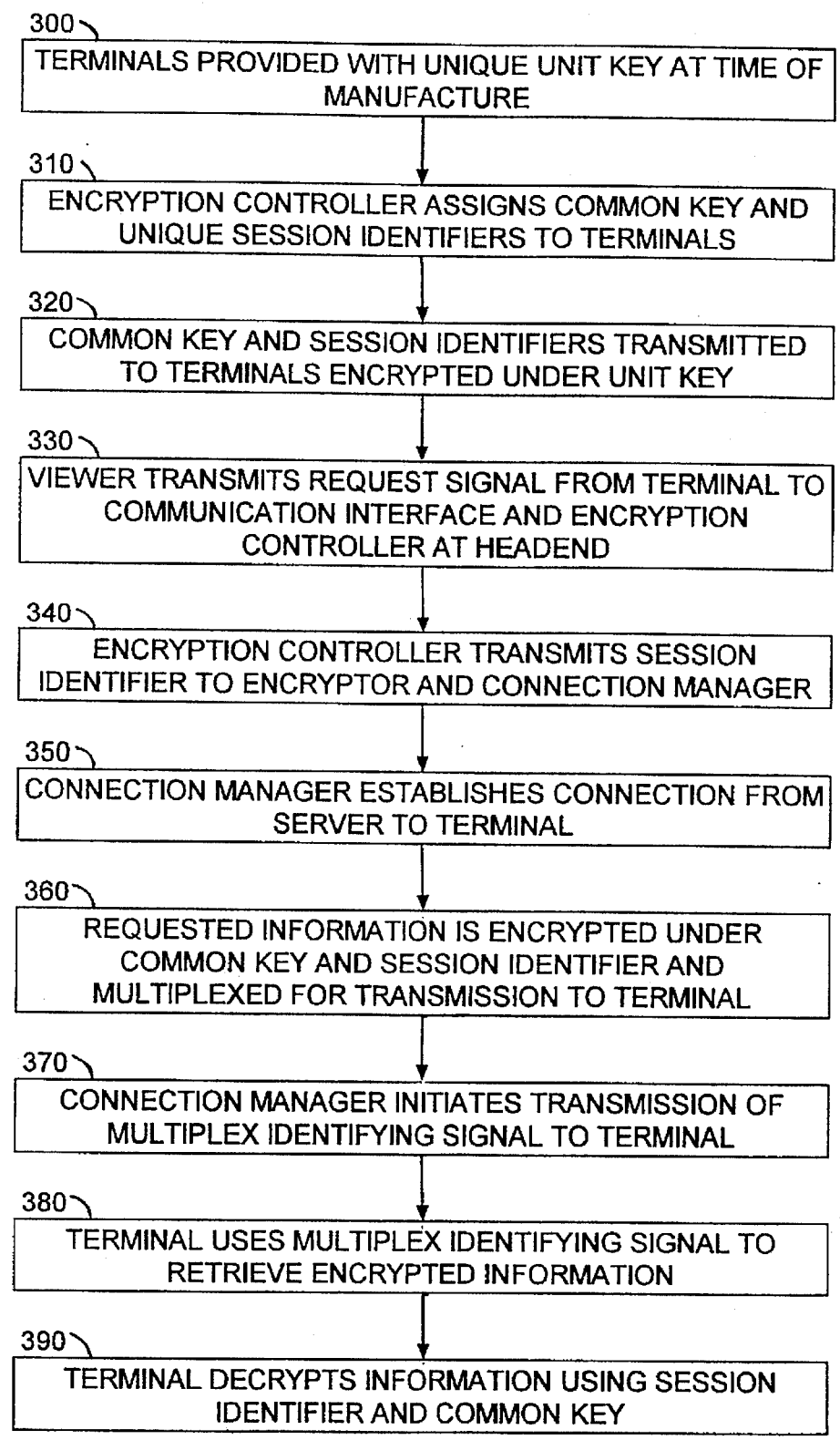
FIG. 3 is a flow chart of a communication scheme of the present invention.

FIG. 3 is a flow chart of a communication scheme of the present invention. FIG. 3 describes one possible embodiment, bearing in mind that other variations are possible. The scheme begins at block 300, where the terminals are provided with unique unit keys at the time of manufacture. At block 310, the encryption controller assigns a common key to a group of terminals, and a unique session identifier for each individual terminal. At block 320, the common key and session identifiers are transmitted via the network to the terminals encrypted under the unit key. Alternatively, the common key and session identifiers may be installed locally at the terminal. At block 330, the viewer transmits a request signal from the terminal to the communication interface and encryption controller at the headend which indicates the information the viewer wishes to see, such as a movie. At block 340, the encryption controller transmits the session identifier to the encryptor and connection manager. Note that this may occur prior to the time when the information is to be delivered to the viewer.

At block 350, the connection manager establishes a connection from the terminal to the appropriate server which carries the requested information. At block 360, the requested information is encrypted under the common key and session identifier and multiplexed for transmission to the terminal. At block 370, the connection manager initiates the transmission of the multiplex identifying signal to the terminal. At block 380, the terminal uses the multiplex identifying signal at the frequency agile tuner and demultiplexer to retrieve the encrypted information. Finally, at block 390, the terminal decrypts the encrypted information using the session identifier and common key which are stored locally at the terminal.

It should now be appreciated that the present invention provides entitlement control in a point-to-point communication system that traverses a shared media. Only the party with the appropriate entitlement to a signal may receive it. Common keys are used for all sessions within the network, and may be disseminated far in advance of the establishment of any point-to-point communication session, i.e., the distribution of a video program or data session. Nonsecure switching equipment can have access to a unique session identifier for the terminal to receive a program, without breaching system security. Although programs are encrypted under the session identifier, the session identifier itself cannot be loaded into a subscriber terminal without knowledge of a secret unit key that is loaded into the subscriber terminal and maintained by a highly secure encryption controller. Other than advising the switching and encryption components of the session identifier, the encryption controller is not actively involved with the encryption of specific signals targeted for a particular subscriber terminal. Since the encryption controller typically advises the switching and encryption components of the session identifier far in advance of a session, it is not involved with the encryption of the signals distributed to the subscriber terminals on a real time basis.

It should also be appreciated that the subscriber terminals used in connection with the invention can be dedicated to point-to-point communications as described herein, or can be general purpose terminals capable of receiving both point-to-point communications and broadcast communications. In providing reception of broadcast signals, conventional security schemes can be used alone or in combination with the teachings of the present disclosure.

Although the invention has been described in connection with a particular embodiment thereof, it should be appreciated that numerous adaptations and modifications may be made thereto, without departing from the spirit and scope of the invention as set forth in the claims.

I claim:

1. A method for secure point-to-point communication of requested information of an information service from a headend to a specific terminal which is coupled to a shared network, comprising the steps of:

securely delivering a different session identifier to each of a plurality of terminals coupled to the network including said specific terminal;

encrypting said requested information to be provided to said specific terminal under the session identifier of that terminal;

inserting the encrypted information into designated locations in a signal multiplex;

transmitting the signal multiplex over a portion of said network serving said specific terminal; and providing an identification signal from said headend for informing said specific terminal of the designated locations of said encrypted information in said signal multiplex and a transmission frequency at which said signal multiplex is carried on said network portion; wherein:

in response to the receipt of said identification signal, said specific terminal tunes to said transmission frequency to locate said signal multiplex, recovers the encrypted information from said designated locations, and decrypts said information using the terminal's session identifier; and said transmitting of said encrypted information in said signal multiplex is initiated by a request signal which is transmitted from said specific terminal to said headend.

2. A method in accordance with claim 1 comprising the further steps of:

providing a common key to each of said plurality of terminals; and encrypting said requested information under said common key as well as under the session identifier of said specific terminal;

whereby said specific terminal decrypts said information using its session identifier and the common key.

3. A method in accordance with claim 2 wherein said specific terminal is instructed during said informing step to immediately tune to said transmission frequency to locate and decrypt said encrypted information.

4. A method in accordance with claim 1 wherein a unique terminal address is used to direct specific instructions to said specific terminal.

5. A method in accordance with claim 1 wherein an initial session identifier is delivered to each of said terminals during installation of the respective terminal at an end user location.

6. A method in accordance with claim 1, wherein said request signal is initiated by a user who desires to receive said requested information via said specific terminal.

7. A shared communication network for providing secure point-to-point communication of requested information of an information service from a headend to a specific terminal which is coupled to the network, comprising:

a plurality of terminals coupled to the network including said specific terminal, each terminal having a unique session identifier stored therein in a secure manner;

means for transmitting a request signal from said specific terminal to said headend via said network;

an encryption controller which maintains a record of said unique session identifiers in a secure manner;

means responsive to said encryption controller for encrypting said requested information to be provided to said specific terminal under the session identifier of than terminal;

means for inserting the encrypted information into designated locations in a signal multiplex;

means for transmitting the signal multiplex over a portion of said network serving said specific terminal; and means associated with said headend for providing an identification signal to said specific terminal for informing said specific terminal of the designated locations of said encrypted information in said signal multiplex and a transmission frequency at which said signal multiplex is carried on said network portion;

said specific terminal including:

a frequency agile tuner which tunes to said transmission frequency to locate said signal multiplex in response to said identification signal, means for recovering the encrypted information from said designated locations of said signal multiplex, and means for decrypting the recovered encrypted information using the terminal's session identifier;

wherein said transmission of said encrypted information in said signal multiplex to said specific terminal is initiated by said request signal.

8. Apparatus in accordance with claim 7 wherein:

said encryption controller provides a common key to said encrypting means and to each of said plurality of terminals; and said encrypting means encrypts said requested information under said common key as well as under the session identifier of said specific terminal, and said specific terminal decrypts said information using its session identifier and the common key.

9. Apparatus in accordance with claim 8 wherein said terminals are responsive to unique terminal addresses for receiving instructions directed thereto from said informing means.

10. Apparatus in accordance with claim 8 wherein said encryption controller is separate from said encrypting means and is configured to have a higher level of security than that of said encryption means, and securely maintains a unique unit key for each of said terminals, said unit keys being used by the encryption controller to securely communicate the session identifiers to their respective terminals.

11. Apparatus in accordance with claim 7 further comprising:
a connection manager for initiating said point-to-point communication of said requested information, said connection manager being responsive to said encryption controller;
a plurality of information servers; and
a switch for selectively combining information from said servers into said multiplex;
wherein said information servers and said switch are responsive to said connection manager for providing said point-to-point communication of said requested information.

12. Apparatus in accordance with claim 11 further comprising:
a plurality of switches coupled to said plurality of information servers for selectively combining information from said servers into a plurality of multiplexes for transmission on different portions of said network;
wherein said plurality of switches are responsive to said connection manager for providing said point-to-point communication of said requested information.

13. Apparatus in accordance with claim 7 wherein the session identifier for each terminal is loaded into the terminal encrypted under a unit key unique to that terminal, said unit key being securely maintained by said encryption controller in a region that is separate from said encrypting means;
said encryption controller being configured to have a higher level of security than that of said encrypting means.

14. Apparatus in accordance with claim 7, wherein said request signal is initiated by a user who desires to receive said requested information via said specific terminal.

15. A terminal for receiving encrypted requested information of an information service specifically directed thereto from a connection manager at a headend over a shared communication network, comprising:
means for securely receiving and storing a session identifier that is unique to the terminal;
said encrypted information being encrypted under said session identifier;
means for receiving frequency and demultiplexing instructions from said connection manager via said network;
a frequency agile receiver responsive to said frequency instructions which tunes to a frequency at which a signal multiplex containing said encrypted information for said terminal is carried on said network;
a demultiplexer coupled to receive said encrypted information from said frequency agile receiver, said demultiplexer being responsive to said demultiplexing instructions for retrieving said encrypted information; and
decryption means coupled to receive said retrieved encrypted information for decrypting said retrieved encrypted information using said session identifier;
wherein transmission of said encrypted information in said signal multiplex is initiated by request data which is transmitted from said terminal to said headend.

16. A terminal in accordance with claim 15, further comprising:
means for receiving and storing a common key;
said encrypted requested information being encrypted under said common key;
wherein said decryption means decrypts said encrypted information using said common key and said session identifier.

17. A terminal in accordance with claim 15 wherein said session identifier is encrypted under a unit key that is unique to said terminal.

18. A terminal in accordance with claim 15, further comprising:
means for transmitting said request data from the terminal to said headend over said communication network; and
means for encrypting said request data under said session identifier prior to said transmitting to said headend;
wherein said headend initiates delivery of said signal multiplex to said terminal in response to the receipt of said request data at said headend.

* * * * *